United States Patent [19]

Quinlan et al.

[11] Patent Number: 4,812,300
[45] Date of Patent: Mar. 14, 1989

[54] SELECTIVE PEROVSKITE CATALYSTS TO OXIDIZE AMMONIA TO NITRIC OXIDE

[75] Inventors: Michael A. Quinlan, San Mateo, Calif.; Ramamurthy Ramanathan, South Burlington, Vt.; Henry Wise, Redwood City, Calif.

[73] Assignee: SRI-International, Menlo Park, Calif.

[21] Appl. No.: 72,724

[22] Filed: Jul. 13, 1987

[51] Int. Cl.$^4$ .............................................. C01B 21/26
[52] U.S. Cl. .................................... 423/404; 502/525
[58] Field of Search ........................................ 423/404

[56] References Cited

U.S. PATENT DOCUMENTS

| 3,884,837 | 5/1975 | Remeika et al. | 252/462 |
| 3,888,792 | 6/1975 | Hughes | 252/462 |
| 3,947,554 | 2/1976 | Senes et al. | 423/403 |
| 4,018,712 | 4/1977 | Li | 252/456 |
| 4,049,583 | 9/1977 | Lauder | 502/303 |
| 4,082,837 | 4/1978 | Whelan | 423/405 |
| 4,124,687 | 11/1978 | Whelan | 423/404 |
| 4,126,580 | 11/1978 | Lauder | 252/462 |
| 4,134,852 | 1/1979 | Volin | 252/472 |
| 4,189,405 | 2/1980 | Knapton | 252/462 |
| 4,363,361 | 12/1982 | Madgavkar et al. | 166/256 |
| 4,389,339 | 6/1983 | James et al. | 252/472 |

FOREIGN PATENT DOCUMENTS

89199 of 0000

OTHER PUBLICATIONS

D. J. Newman in "Nitric Acid" in *Kirk-Othmer: Encyclopedia of Chemical Technology*, 3rd Ed., vol. 15, pp. 853–871, published in 1981.

R. J. Voorhoeve et al, "Perovskite Oxides: Materials Science in Catalysis", *Science*, vol. 195, No. 4281, pp. 827–833, published Mar. 4, 1977.

R. J. Voorhoeve in Chapter 5, "Perovskite-Related Oxides as Oxidation-Reduction Catalysts" (Source) Advanced Materials in Catalysis, by J. J. Burton & R. L. Garten (eds), Academic Press: New York, p. 129 (1976).

E. A. Lombardo, et al., "XPS Characterization of Reduced LaCoO$_3$ Perovskite", *Journal of Catalysis*, vol. 80, pp. 340–349 (1983).

J. O. Petunchi et al, "Characterization of Hydrogenation Active Sites on LaCoO$_3$ Perovskite", *Journal of Catalysis*, vol. 70, pp. 356–360, (1981).

T. Nakamura et al, "Stability of the Perovskite Phase LaBO$_3$ (B=V, Cr,Mn,Co,Ni) in Reducing Atmosphere", *Materials Research Bulletin*, vol. 14, pp. 649–659 (1979).

H. Arai et al, "Catalytic Combustion of Methane over Various Perskite-Type Oxide", *Applied Catalysis*, vol. 26, pp. 265–276 (1986).

*Primary Examiner*—John Doll
*Assistant Examiner*—Wayne A. Langel
*Attorney, Agent, or Firm*—Phillips, Moore, Lempio & Finley

[57] ABSTRACT

The present invention relates to perovskite mixed metal catalysts useful for the selective oxidation of ammonia to nitric oxide. In one aspect, the invention relates to a perovskite mixed metal catalyst of the general formula: ABO$_3$ wherein:

A is selected from alkali, alkaline earth, rare earth, lanthanide activide metals or mixtures thereof; and B is selected from an element or a combination of elements selected from Groups IB, IVB, VB, VIB, VIIB or VIII of the Periodic Table. Preferably, the perovskite phase for each catalyst has an equilibrium oxygen partial pressure at 1000° C. of at least (about) $10^{-15}$ bar. A preferred embodiment is a catalyst wherein A is selected from lanthanum, strontium or mixtures thereof, and B is selected from cobalt, nickel, copper manganese or mixtures thereof. A method of preparing the selective perovskite catalyst is disclosed as are details of the process for the oxidation of ammonia to nitric oxide.

11 Claims, 6 Drawing Sheets

Lanthanum Cobaltate

Lanthanum Manganate

SELECTIVE PEROVSKITE CATALYSTS TO OXIDIZE AMMONIA TO NITRIC OXIDE

BACKGROUND OF THE INVENTION

1. Field of the Invention

The present invention relates to perovskite mixed metal catalysts for the selective oxidation of ammonia ($NH_3$) to nitric oxide (NO). Nitric acid is an industrial chemical of great commercial value. The production of nitric acid, its preparation from NO and its usefulness in industry is described by D. J. Newman in "Nitric Acid" in the *Kirk-Othmer: Encyclopedia of Chemical Technology*, 3rd Ed, Vol. 15, pgs. 853–871, published in 1981 and the references cited therein.

2. Description of the Relevant Art

An essential step in the manufacture of nitric acid is the catalytic oxidation of ammonia to nitric oxide and other nitrogen containing products. The present industrial process is a high-temperature operation using expensive noble metal catalysts. It is highly desirable to be able to replace these very expensive metal catalysts with low-cost, highly selective long-lived, mixed metal-oxide catalysts which possess high activity and selectivity for nitric oxide production.

The use of perovskites as catalysts for the conversion of nitrogen compounds to nitrogen and of organic compounds containing carbon and hydrogen to CO, $CO_2$ and water, respectively, is generally discussed by R. J. H. Voorhoeve et. al. in "Perovskite Oxides: Materials Science in Catalysis" in *Science*, Vol. 195. No. 4281, pgs. 827-833, published Mar. 4, 1977; and also by R. J. H. Voorhoeve in Chapter 5, "Perovskite-Related Oxides as Oxidation Reduction Catalysts" in *Advanced Materials in Catalysis* J. J. Burton and R. L. Garten (eds) Academic Press: New York, P. 129 (1976).

Generally, perovskite catalysts have been used in the reduction of NO to $N_2O$ and $N_2$ to decrease the emission of NO into the atmosphere.

There have been only scattered, unconfirmed non-enabling fragmentary oral rumors of the possible use of a perovskite catalyst to selectively oxidize ammonia to nitric oxide, $2NH_3 + 5/2O_2 \rightarrow 2NO + 3H_2O$, with a minimum of by-products, such as $N_2O$ and $N_2$.

S. Sekido, et al in European patent application No. 89,199 disclose perovskite-type oxide catalysts, for conversion of auto exhaust and combustion gases to $CO_2$ and $H_2O$ of the general form:

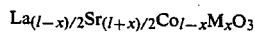

$$La_{(1-x)/2}Sr_{(1+x)/2}Co_{1-x}M_xO_3$$

where M=Fe, Mn, Cr, V or Ti and x is between 0.15 and 0.90. The quantities of HC, CO and NO in a combusted city gas treated with the perovskite catalyst were reduced.

In U.S. Pat. No. 3,884,837, J. P. Remeika et al. disclose mixed metal oxide catalysts having perovskite-like structures for the conversion of $NO_x$ pollutants to $N_2O$, $N_2$ and $O_2$.

In U.S. Pat. No. 3,888,792, D. O. Hughes discloses the formation of shaped bodies for catalysts in industrial processes. A catalyst in the form of a shaped body has adequate mechanical strength for use in industrial processes. The catalysts are prepared by co-precipitating from solution as carbonates or basic carbonates cobalt and at least one of the elements of the oxides, washing and drying the precipitates. The dried precipitate is heated between 250° and 450° C. for a time sufficient to convert the carbonates to their respective oxides, comminuting the mixture of oxides, shaping the mixture into bodies and heating the shaped bodies in the range of 600° to 850° C. The catalysts obtained were tested using an ammonia oxidation reactor. The oxidation efficiency of the perovskite catalyzed reaction of ammonia to nitric oxide was measured at various gas rates over the shaped body catalysts at a catalyst bed temperature of 650° C. using an ammonia/air mixture having a volume ratio 1:10 ammonia/air.

In U.S. Pat. No. 4,018,712, T. P. Li discloses an improved catalyst for the oxidation of ammonia to nitric oxide. The catalyst contains the elements: antimony, uranium, iron, bismuth and molybdenum, and optionally, nickel or cobalt. The method of preparing the catalyst and the catalytic oxidation conditions are disclosed.

In U.S. Pat. No. 4,082,837, J. M. Whelan discloses a process for the selective oxidation of ammonia to nitric oxide in the presence of a variety of ceramic catalysts. The ammonia is passed over a ceramic catalyst having an empirical formula at elevated temperature of $W_K X_N J_{(1-K-N)} ZO_{(3+OR-M)}$ where W is zirconium, tin, or thorium or mixtures thereof; X is an alkaline earth metal or mixtures thereof; J is scandium, Yttrium, a rare-earth element or a mixture thereof; Z is a metal of the first transition series or a mixture thereof, at least 0.01% of said metal having an oxidation state other than $+3$. K is a number having a value between 0 and about 0.1; M is a number having a value of from 0 to about 0.26; and N is a number from 0 to about 0.51 provided that when N has a value of 0, K has a value of between 0 and 0.05.

In U.S. Pat. No. 4,124,687, J. M. Whelan similarly discloses a process for the selective oxidation of ammonia to nitric oxide at temperatures of 100°–400° C. in the presence of ceramic catalysts.

In U.S. Pat. No. 4,126,580, A. Lauder discloses a number of perovskite mixed metal catalysts for use in oxidation of hydrocarbons and reduction of NO to $N_2$ of the general formula: $ABO_3$, where A and B are specific metal atoms. The surface area of these perovskites is low.

In U.S. Pat. No. 4,134,852, T. E. Volin discloses a high energy impact method to formulate mixtures of metal compounds as powders, followed by treatment with heat. Catalytic materials having a general empirical formula: $ABO_3$, and a perovskite-type crystal structure are obtained.

In U.S. Pat. No. 4,189,405, A. G. Knapton et al. disclose the preparation of a number of mixed metal oxide catalysts for use in a deposition on metallic shaped articles.

In U.S. Pat. No. 4,363,361, A. J. Madgavkos et al. disclose the oxidation of carbon-containing compounds using perovskite-type crystal structure.

In U.S. Pat. No. 4,389,339, L. E. James, et al., disclose the preparation of a ceramic cobalt oxide/cobalt nitrate catalyst to oxidize ammonia to nitric oxides. This particulate cobalt oxide catalyst has high activity and improved resistance to disintegration and improved ammonia oxidation.

None of the above references individually or together disclose or suggest the present invention which is the preparation of certain perovskite catalysts having a certain range of lattice oxygen binding energies and/or high surface area of between about 20 to 50 meters$^2$/- gram or greater or the use of these and other perovskite catalysts to selectively oxidize ammonia to nitric oxide.

SUMMARY OF THE INVENTION

In one aspect the present invention relates to a process for the selective oxidation of ammonia to nitric oxide, which process comprises:

(1) contacting gaseous ammonia in an oxygen containing gas optionally with an inert gaseous diluent with a mixed metal perovskite catalyst of the general formula: $ABO_3$, wherein:

A is selected from the alkali, alkaline earth, lanthanide, or actinide metals or a mixture of these metals having a relatively large ionic radius, and B is selected from an element or a combination of elements selected from Groups IB, IVB, VB, VIB, VIIB or VIII of the Periodic Table, wherein the perovskite catalyst has an equilibrium partial pressure of oxygen at 1000° C. of greater than about $10^{-15}$ bar; and (2) heating the reactants of step (1) at greater than about 500° C. under conditions of 10 to 100,000 $hr^{-1}$ gas hourly space velocity.

In another aspect, the present invention relates to a catalyst containing an active metal oxide consisting essentially of a metal oxide having the general formula: $ABO_3$ and having a perovskite crystal structure, wherein A and B are each at least one metal cation in sites of type A and type B respectively, wherein:

(a) the type A metal cation sites are selected from the alkali, alkaline earth, rare earth, lanthanide or actinide metals; and B is selected from an element or a combination of elements selected from Groups IB, IVB, VB, VIB, VIIB or VIII of the Periodic Table; and $ABO_3$ has an oxygen lattice binding energy measured by the critical oxygen partial pressure at 1000° C. of greater than about $10^{-15}$ bar.

In another aspect the present invention relates to the preparation of a perovskite structure mixed metal catalyst of the general formula $ABO_3$, where A and B represent metal cations primarily for use in the selective oxidation of ammonia to nitric oxide, and in catalyst $ABO_3$;

A is selected from the alkali, alkaline earth, rare earth, lanthanide, actinide metals or a mixture of these metals having a relatively large ionic radius; and B is selected from an element or combination of elements selected from Groups IB, IVB, VB, VIB, VIIB and VIII of the Periodic Table, which process comprises:

(a) combining an essentially equimolar aqueous solution of soluble salts of A or mixtures thereof with an equimolar aqueous solution of soluble salts of B or mixtures thereof;

(b) treating the solution of step (a) with tetraalkylammonium hydroxide wherein alkyl has 1 to 4 carbon atoms to precipitate a mixture of metal hydroxides of A and B with separation of the precipitate and liquid;

(c) washing the precipitate of step (b) with water until the wash water is substantially neutral;

(d) drying the precipitate of step (c) in vacuum;

(e) calcining the dried precipitate of step (d) in flowing oxygen/air at between about 600° and 900° C. for between about 6 to 18 hrs; and (f) recovering the perovskite catalyst having a critical oxygen partial pressure (below which the perovskite structure collapses) at 1000° C. in the range of greater than $10^{-15}$ bar.

In another aspect the present invention relates to the catalyst prepared by the processes described herein.

In still another aspect, the present invention relates to the selective oxidation of ammonia to nitric oxide, which process comprises:

(1) contacting a mixture of ammonia and oxygen optionally admixed with a nonreactive gas with a perovskite catalyst as described herein;

(2) heating the reactants of step (1) at between about 300° and 700° C. under conditions of 10 to 100,000 $hr^{-1}$ gas hourly space velocity (GHSV); and (3) recovering the nitric oxide formed.

DETAILED DESCRIPTION OF THE INVENTION AND PREFERRED EMBODIMENTS

Figure 1:
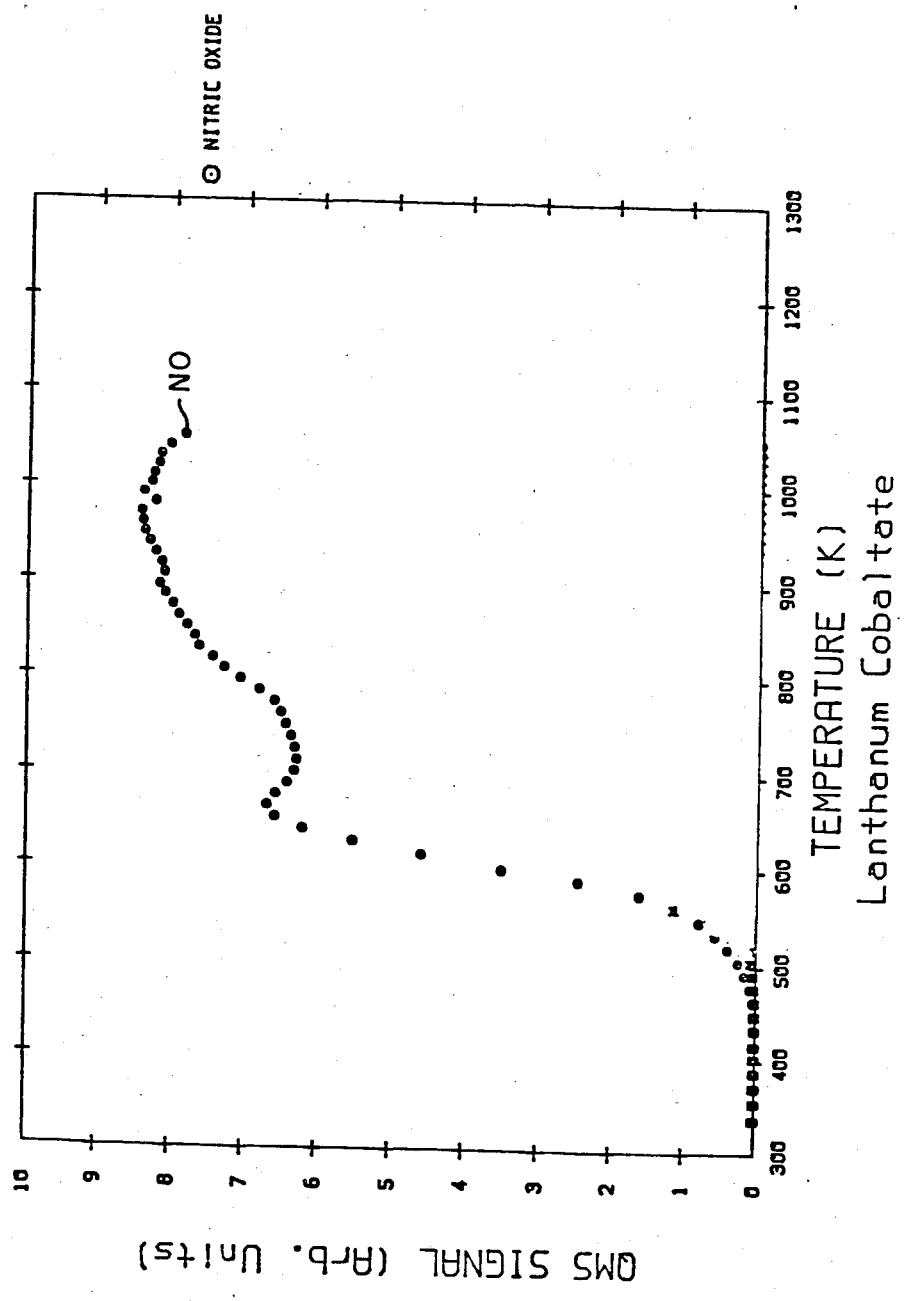
FIG. 1 shows the nitric oxide concentration in arbitrary units resulting from the oxidation of $NH_3$ in a temperature programmed reaction using lanthanum cobaltate as a catalyst.

As used herein:

"Critical oxygen partial pressure" refers to the equilibrium partial pressure of oxygen at 1,000° C. below which the perovskite structure of the catalyst is not stable.

"Nonreactive gas" or "inert diluent" refers to those gases that do not react or interfere with the catalytic oxidation. Preferred gases include helium, neon, argon, krypton, nitrogen or mixtures thereof. More preferred gases include helium and nitrogen and mixtures thereof.

"Optional" or "optionally" means that the subsequently described component event or circumstance may or may not be present or occur, and that the description includes instances where said components, event or circumstance is present, occurs and instances in which it does not. For example, "optionally substituted phenyl" means that the phenyl may or may not be substituted and that the description includes both unsubstituted phenyl and phenyl wherein there is substitution; "optionally in an inert diluent" means that said diluent may or may not be present in order for the process described to fall within the invention, and the invention includes those processes wherein the diluent is present and those processes in which it is not.

"Perovskite" refers to a structural class of mixed metal oxides, e.g. $ABO_3$ wherein A and B are defined herein which are structurally analogous to the naturally occurring mineral perovskite ($CaTiO_3$). In the ideal perovskite structure, the cations possess the appropriate relative sizes and coordination properties to form a cubic crystalline structure in which the smaller B site cations occupy the corners of unit cubes and the larger A site cations occupy the centers of the cubes. Oxygen ions are located at lattice sites which provide octahedral coordinations with B ions and dodecahedral coordination with A ions. The expression "perovskite-like" or "perovskite-type" includes strained or distorted cubic crystal structures which result from variations in the sizes of the metal ions as well as variations in the valence of the metal ions. It is possible that the catalyst may only contain a portion of the cations in the ideal perovskite-type structure due to the specific combination of cations, the method of preparing the catalyst or for some other reason.

"Supports" or "catalyst supports" in the process of this invention can be any of the conventional refractory oxide supports well known in the art. These include, for example, alumina, silica, magnesia, thoria, titania, zirconia, silica-aluminas, silica-zirconias, magnesia-aluminas and the like. Other suitable supports include the naturally occurring clays such as diatomaceous earth.

"Tetraalkyl ammonium hydroxide" refers to hydroxides wherein the alkyl group contains from 1 to 4 carbons, i.e., methyl, ethyl, n- and i-propyl, and n-, iso-, sec- and tert-butyl. Methyl is preferred.

In the present invention, the specific perovskite catalysts are used to selectively oxidize ammonia to nitric oxide.

Catalysts

The preparation of perovskite catalysts having an initial surface area of up to 16 meters$^2$/gram or less is generally described by E. A. Lombardo et al., (*Journal of Catalysis*, vol. 80, pgs.. 340-349 (1983)) and J. O. Petunchi et al. (*Journal of Catalysis*, vol. 70, pgs. 356-360 (1981)).

In the present invention, metal A soluble salts, e.g. $LaCl_3$, $La(NO_3)_3$ etc. and metal B soluble salts e.g. $Co(NO_3)_2$ etc.) are combined as aqueous solutions between about 0.01 and 1 molar. The mixture of metal hydroxides, e.g. $La(OH)_3$ and $Co(OH)_3$ are precipitated using a tetra-alkyl ammonium hydroxide. Tetramethylammoniumhydroxide is preferred. The precipitates are washed and then dried in a vacuum of between about 10 and 100 microns Hg for between about 24 and 72 hrs, preferably about 48 hrs, at about ambient temperature. The precipitate is then calcined in flowing gas of between about 20 and 100% oxygen in a nonreactive gas, such as nitrogen, at between about 700° and 1200° C., preferably about 800° to 900° C. The perovskite catalyst obtained has a surface area of about 20 meters$^2$/grams to 50 meters$^2$/grams or greater.

In the present invention, perovskite catalyst of the formula: $ABO_3$ wherein, metal A cation is selected from the elements represented by the alkali, alkaline earth, lanthanide, actinide or a mixture of these elements. The lanthanide cations, alkaline earth cations or mixtures thereof are preferred. More preferred A cations are lanthanum, alkaline earth cations or mixtures thereof. Particularly preferred A cations are mixtures of lanthanum with one alkaline earth cation. Especially preferred cations are lanthanum and strontium.

In a primary embodiment, the A and B cations are selected with the proviso that A or B are not the combination of cobalt and cerium or of lanthanum and cobalt.

The B type cations are selected from elements or a combination of elements selected from Groups IB, IVB, VB, VIB, VIIB or VIII of the Periodic Table which is incorporated herein by reference. Those B cations in Groups VIIB and VIII are preferred. More preferred B cations are chromium, manganese, cobalt, nickel or copper, or mixtures thereof. Especially preferred are B cations which include manganese, cobalt or nickel.

In the processs to prepare the catalysts of the present invention, a preferred embodiment is where A is selected from lanthanum, strontium or mixtures thereof, and B is selected from cobalt, nickel, manganese of mixtures thereof with the proviso that where A is lanthanum only, B is not cobalt.

An additional preferred embodiment is where A is a mixture of lanthanum and strontium.

An additional preferred embodiment is where the ratio of lanthanum to strontium in the catalyst of substep (f) is between about 10/90 and 90/10, especially between about 75/25 and 25/75.

For these compounds, the lattice oxygen binding energy lies within such a range that oxidation of ammonia to NO or $N_2O$ is selectively accomplished depending upon the operating temperature. One measure of this range of acceptable lattice oxygen binding energies is the critical oxygen partial pressure below which the perovskite phase collapses at a specified temperature. Using 1000° C. as the specified temperature, the requisite critical oxygen partial pressures will be greater than $10^{-15}$ bar, preferably in the range of between about $10^{0.6}$ and $10^{-15}$ bar (0.3 to $10^{-15}$ atmosphere).

These perovskite-type catalysts readily exchange oxygen between the lattice oxygen of the solid and the gas phase oxygen. A key feature of the present invention is the linking of the lattice oxygen binding energy, as measured by the equilibrium oxygen partial pressure of the perovskite-gaseous phase, with the tendency towards the selective conversion of ammonia to nitric oxide. The perovskite maintains structural integrity during the exchange of oxygen between the lattice and the gas phase.

The chemical stability of the perovskite phase for several compounds has been reported by T. Nakamura et al., in *Materials Research Bulletin*, Vol. 14, pp. 649-659, 1979, which is specifically incorporated herein by reference. The stabilities of $LaBO_3$ where B=vanadium (V), manganese (Mn), iron (Fe), cobalt (Co) and nickel (Ni) were studied by thermogravimetry at 1000° C. in gas mixtures of $CO_2/H_2$, $O_2/CO_2$ and $O_2$/argon at a total pressure of 1 bar. In this reference, the stability limits of the perovskite phase for each compound at 1000° C. is expressed by the critical oxygen partial pressure, below which the perovskite phase decomposes. They are as follows:

| Compound | $P_{O_2}$ (bar) |
|---|---|
| $LaVO_3$ | $<10^{-21}$ |
| $LaCrO_3$ | $<10^{-21}$ |
| $LaMnO_3$ | $10^{-15}$ |
| $LaFeO_3$ | $10^{-17}$ |
| $LaCoO_3$ | $10^{-7}$ |
| $LaNiO_3$ | 0.3 |

The composition of the actual catalyst is independently defined in terms of the following three parameters:

(1) Most generally, a mixed metal oxide of the general formula $ABO_3$ having the perovskite type structure whose equilibrium oxygen partial pressure (below which the perovskite structure collapses) at 1000° C. is greater than $10^{-15}$ bar, preferably within the range $10^{-0.6}$ to $10^{-15}$ bar.

(2) A broad range of $A_{1-x}A'_xBO_3$ where:

A' is calcium (Ca), strontium (Sr) or barium (Ba);

B is any transition metal having polyvalent $+3$ and $+4$ oxidation states;

A is any trivalent lanthanide cation; and X is between zero and 1; or (3) The specific compounds which were tested are $LaMnO_3$, $LaCoO_3$, $LaNiO_3$, $La_{1-x}Sr_xMnO_3$ and $La_{1-x}Sr_xCoO_3$, where x is between 0.25 and 0.5.

A preferred embodiment of the catalyst described in the SUMMARY is where A is selected from lanthanum, strontium or mixtures thereof; and B is selected from cobalt, nickel, manganese or mixtures thereof, optionally with the proviso that when A is lanthanum only, B is not cobalt.

A preferred embodiment of the catalyst is where A of $ABO_3$ is a mixture of lanthanum and strontium in a ratio of between about 10/90 and 90/10, especially when B is selected from manganese or cobalt.

Oxidation of Ammonia to Nitric Oxide

A number of perovskite catalysts were prepared as described above to selectively oxidize ammonia to nitric oxide. In a temperature programmed reaction (TPR), a catalyst sample exposed to a stream of $NH_3$—$O_2$—Helium feedstock is raised in temperature at a time-linear rate while the products are analyzed continuously by an on-line mass spectrometer (MS). This technique identifies the temperature range of useful catalytic activity and also provides a measure of relative efficiency among the catalysts tested.

The tests are performed in a quartz fixed bed reactor ($\frac{1}{4}''$ O.D.) containing 0.05 to 0.10 g of the catalyst on the quartz frit using an on-line mass spectrometer to analyze the feedstock and product streams. The tests are discussed in detail in Example 5 and shown in Table 1 and Table 3 below.

The stability of a perovskite catalyst is determined by long term catalytic studies proceeding at elevated temperatures for over 200 hrs. This test is discussed below in Example 6 and shown in Table 2 below. The lanthanum nickelate ($LaNiO_3$) shows both high selectivity at 923K and 1123K for 220 and 255 hrs., respectively.

Figure 4:
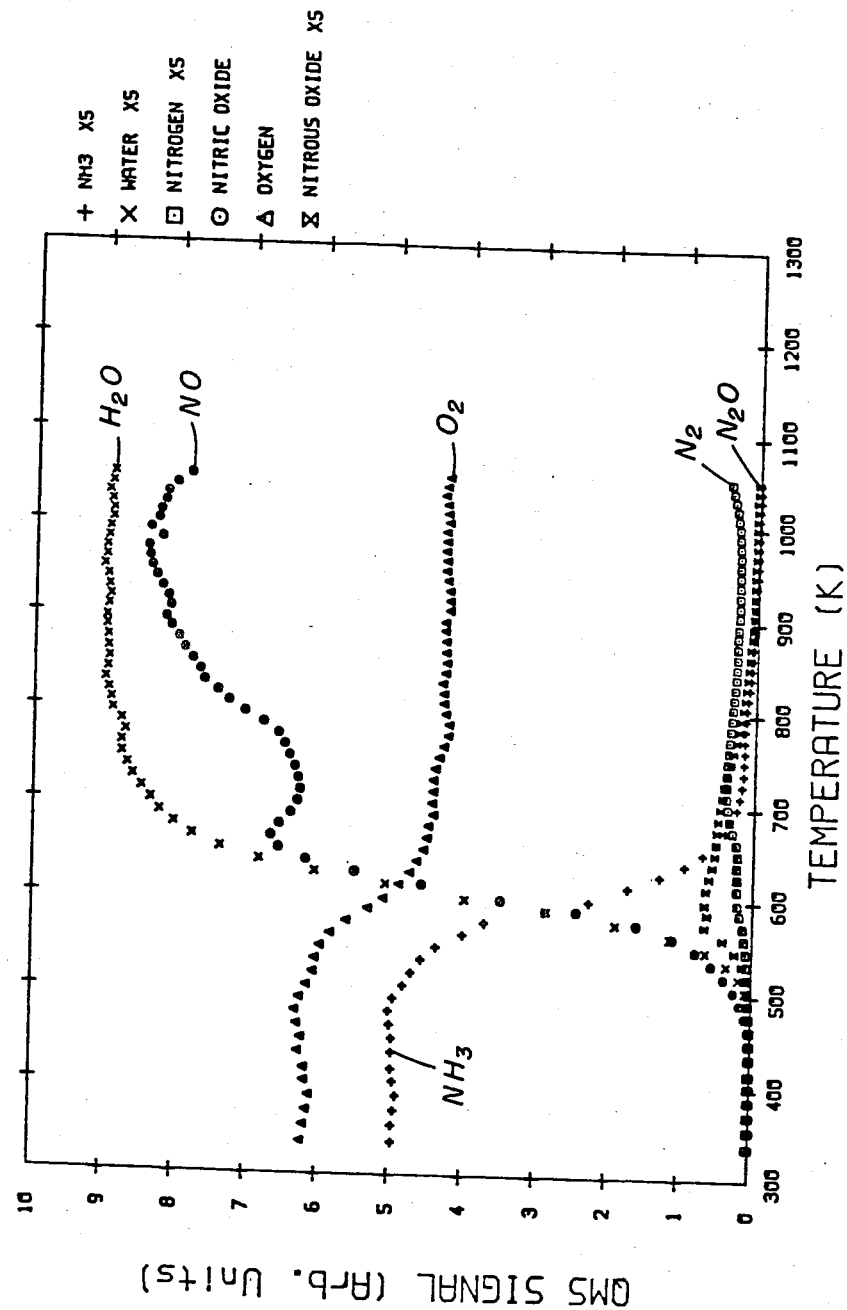
FIG. 4 shows the major products of the temperature programmed reaction as found in FIG. 1 for nitric oxide.

FIG. 1 shows a typical result for nitric oxide produced by the temperature programmed reaction (TPR) method. A reactive gas mixture containing 3.3 vol.% ammonia and 6.7 vol.% oxygen and 90 vol.% in helium flows through about 30 mg. of lanthanum cobaltate at about 90 cc/min. As the temperature of the reactor is raised at 8° C./min, the onset of reaction is noted by the simultaneous decline in the concentration of ammonia and oxygen species and the appearance of NO, $H_2O$ and $N_2$ as reaction products starting at about 500K (FIG. 4). At all temperatures from 500 to 1050 K., the selectivity to NO and $N_2O$ over $N_2$ is very high. The rate of $N_2O$ reaches a maximum between 500 and 700 K. and then declines. A maximum in NO selectivity is reached at 940 K. Above a temperature of 1000 K., the rate of NO is seen to decline with an accompanying increase in $N_2$ production.

Figure 2:
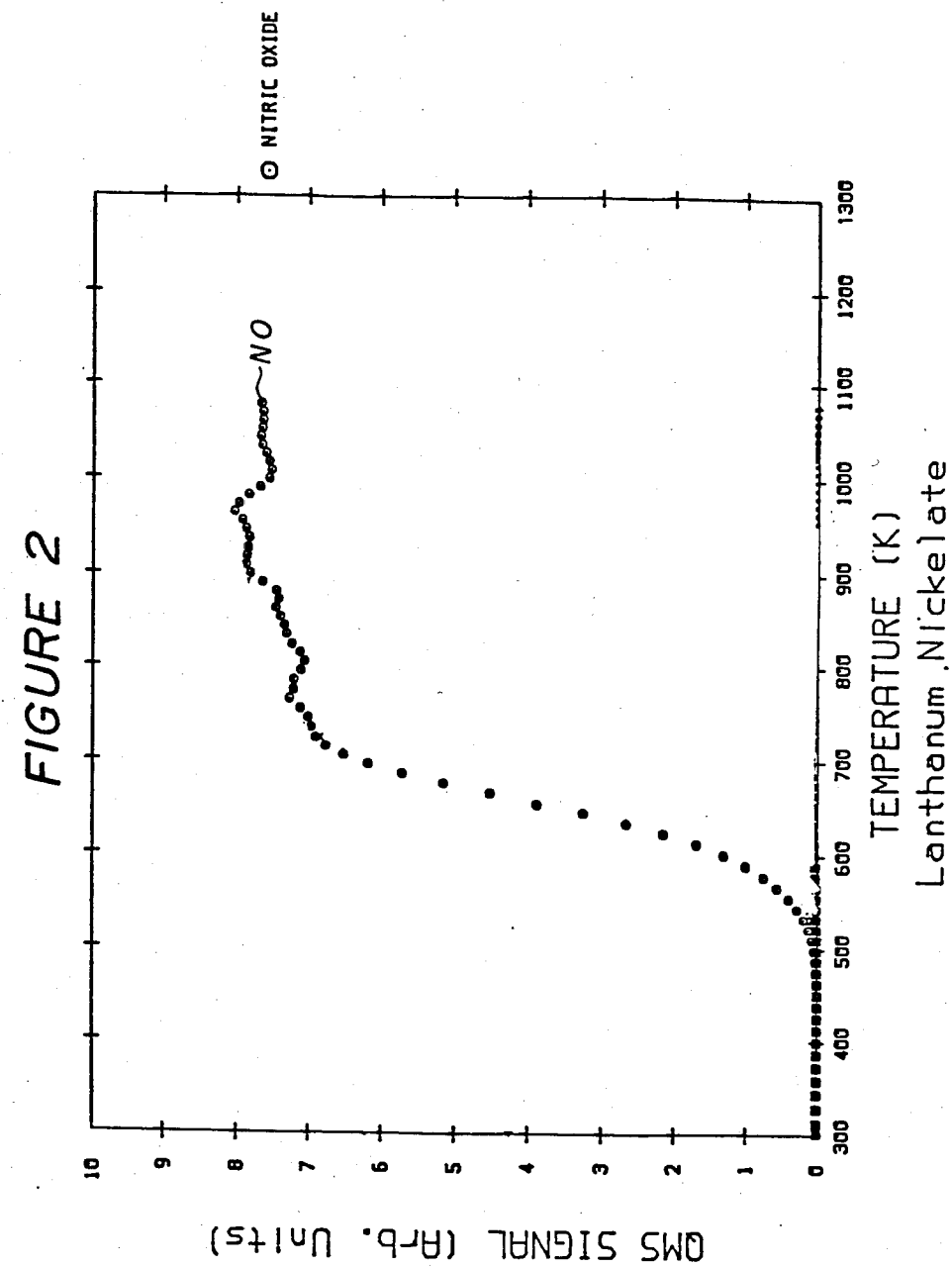
FIG. 2 shows the nitric oxide concentration in arbitrary units resulting from the oxidation of $NH_3$ in a temperature programmed reaction using lanthanum nickelate as a catalyst.
Figure 3:
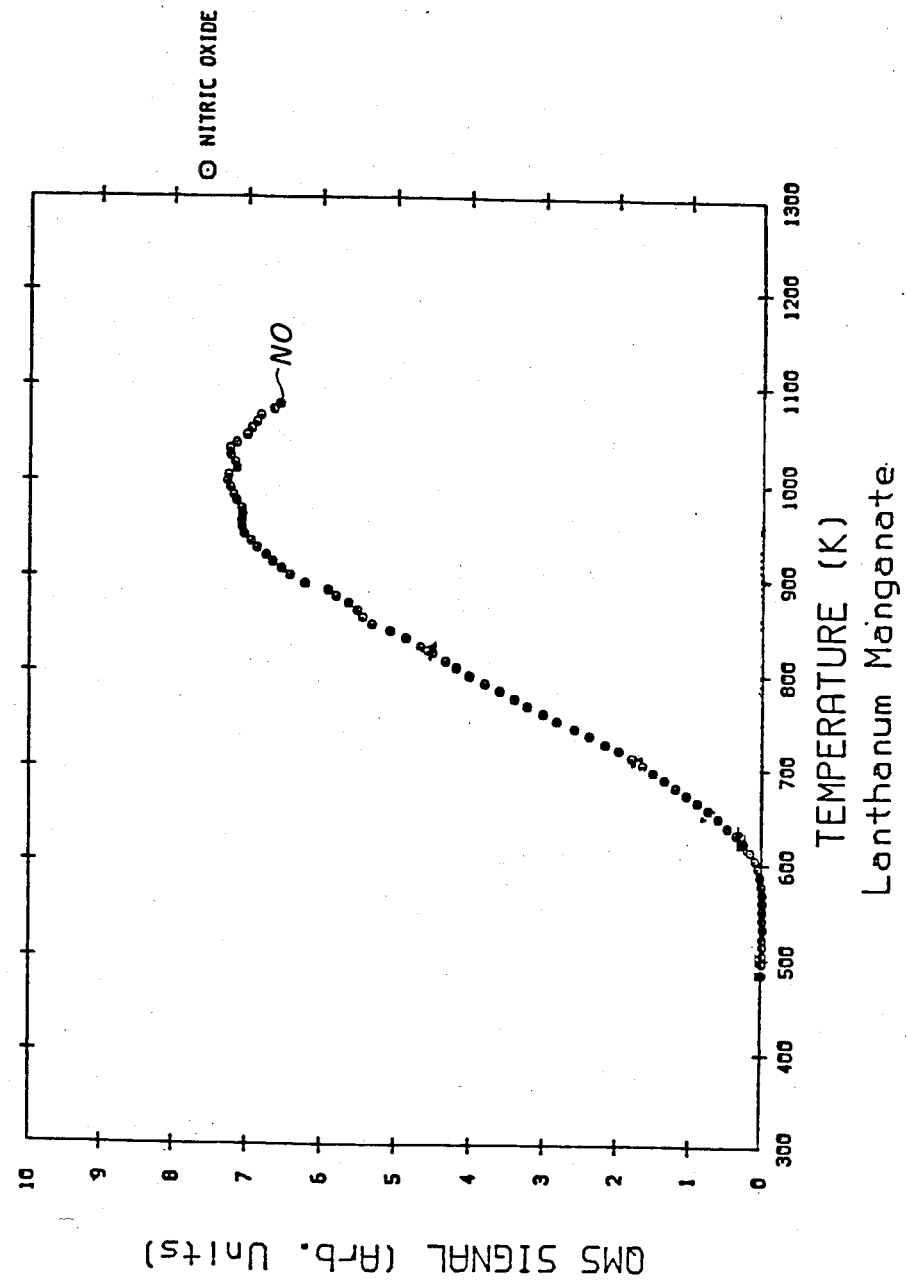
FIG. 3 shows the nitric oxide concentration in arbitrary units resulting from the oxidation of $NH_3$ in a temperature programmed reaction using lanthanum manganate as a catalyst.
Figure 5:
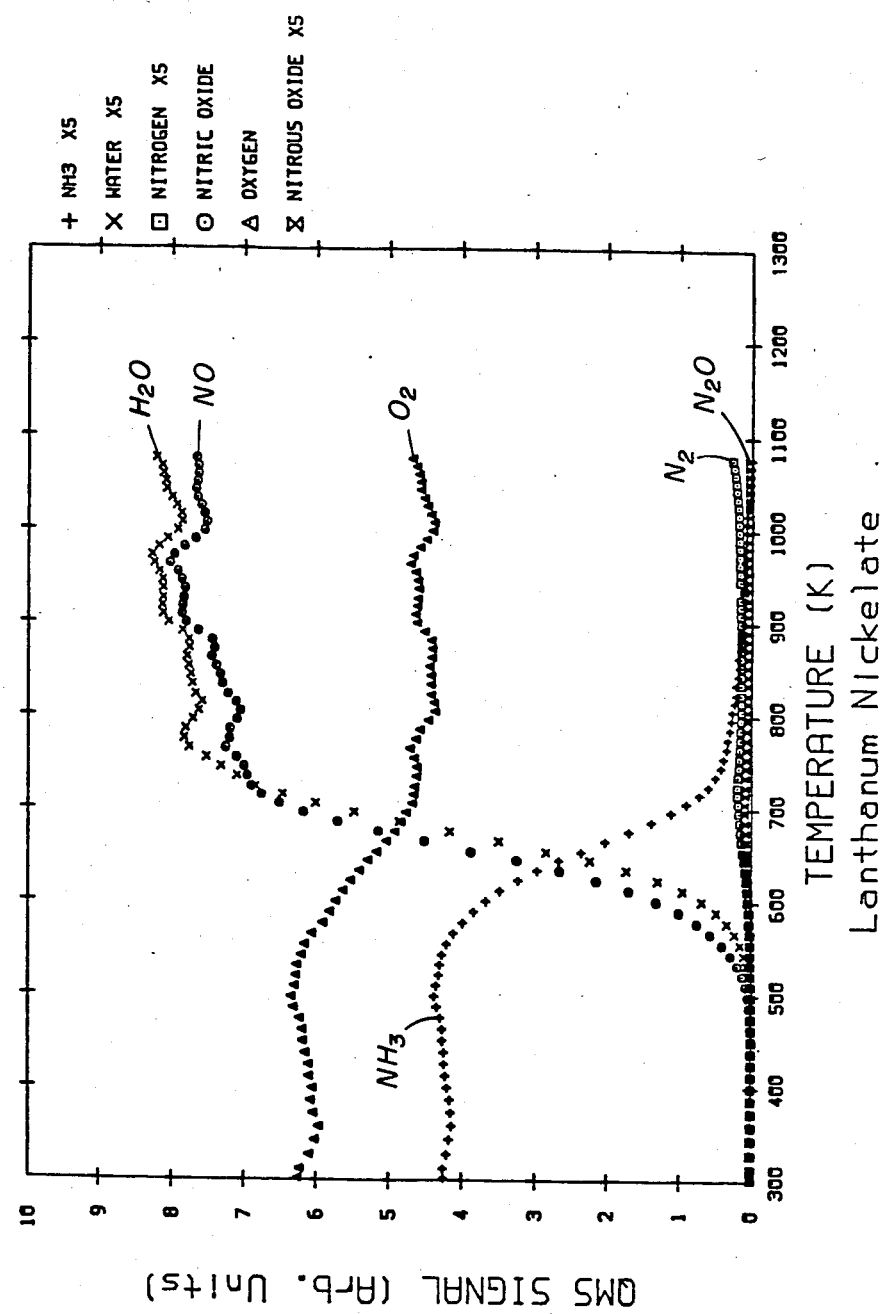
FIGS. 5 and 6 show the major products of the temperature programmed reaction as found in FIGS. 2 and 3 for nitric oxide.
Figure 6:
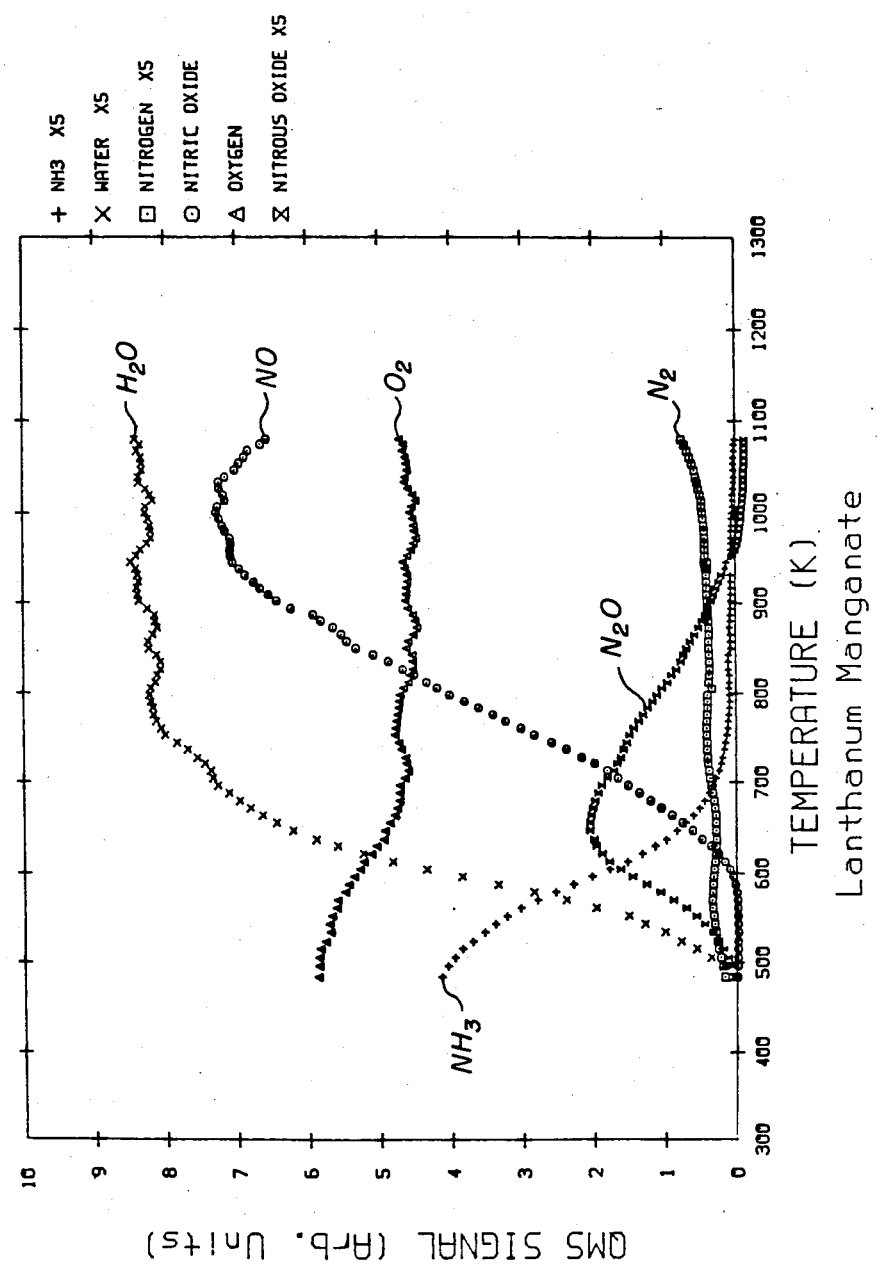

FIGS. 2 and 3 show the results of nitric oxide production using the same technique (TPR) for the lanthanum nickelate and lanthanum manganate catalysts under the same conditions described for FIG. 1. FIGS. 5 and 6 show the major products of the TPR as found in FIGS. 2 and 3 for nitric oxide. Qualitatively, the patterns are alike, differing mainly in the temperature at which the reaction begins as well as differences in the amount of $N_2O$ produced at low temperatures (500°-700° K.). For all three catalysts, the selectivity to NO is very high in the temperature range 500-1100 K.

In another process for the selective oxidation of ammonia to nitric acid as described in the SUMMARY is the process wherein A is selected from a lanthanum, strontium or mixtures thereof, and B is selected from cobalt, nickel, manganese or mixtures thereof.

An additional preferred embodiment of the process is where A is selected form lanthanum, strontium or mixtures thereof, and B is selected from cobalt, nickel, manganese or mixtures thereof, with the proviso that when A is lanthanum only, B is not cobalt.

An additional preferred embodiment of the process is where in step (2) the heating is between about 500° and 1200° C., especially between about 500° and 770° C.

An additional embodiment of the process is where A is a mixture of lanthanum and strontium, preferably where the ratio of lanthanum to strontium is between about 10/90 and 90/10, especially between about 75/25 and 25/75.

A preferred embodiment of the process is where in step (2), the temperature is between about 570° and 770° C., and the gas hourly space velocity is between about 1,000 and 10,000 $hr^{-1}$.

The following Examples are provided to further explain and describe the present invention. They are to be considered illustrative only and are not to be construed to be limiting in any way.

EXAMPLE 1

Preparation of $LaCoO_3$ Perovskite Catalyst Solution

To a dilute solution containing 4.408 g $La(NO_3)_3 \cdot 6H_2O$ and 2.540 g $Co(CH_3COO)_2 \cdot 4H_2O$ is added about 20 g of 25% tetramethylammonium hydroxide solution at ambient temperature. The mixture of metal hydroxides precipitates within one hour, and the precipitate is repeatedly washed with water until the wash water is near neutral. The precipitate is then dried in vacuum (0.01–10 mm Hg) for 48 hrs. The dried precipitate is then calcined in flowing oxygen (20–100% oxygen, and 0–80% nitrogen) for 16–18 hr. at 800° C. The product obtained had a surface area of 5.8 meters$^2$/gram as determined by dynamic measurements using nitrogen as the adsorbate.

EXAMPLE 2

Preparation of $La_{.5}Sr_{.5}CoO_3$

To a 150-ml solution containing 2.475 g $La(NO_3)_3 \cdot 6H_2O$; 2.838 g of $Co(CH_3COO) \cdot 4H_2O$, and 1.224 g of $Sr(CH_3COO)_2 \cdot \frac{1}{2}H_2O$ is added 25 ml of 25% tetramethylammonium hydroxide solution at ambient temperature. The solution is vigorously stirred for one hour. The precipitate is vacuum filtered and washed with distilled water until the wash water is near neutral. The precipitate is then dried in vacuum and calcined as is described in Example 1 above.

EXAMPLE 3

Preparation of $LaCo_{.5}Cu_{.5}O_3$

To 150-ml of distilled water is added $La(NO_3)_3 \cdot 6H_2O$, 5.2475 g; $Co(CH_3COO)_2 \cdot 4H_2O$, 1.4988 g; $Cu(NO_3)_2 \cdot 3H_2O$, 1.4603 g. To this solution is added 24 g. of tetramethylammonium hydroxide at ambient temperature. The precipitate is purified, dried and calcined as is described in Example 2.

EXAMPLE 4

Preparation of LaMn.5Cu.5O3

In 150 ml of distilled water is added $La(NO_3)_3 \cdot 6H_2O$, 5.2913 g; $Mn(NO_3)_2$ as a 63% solution, 1.7284 g; and $Cu(NO_3)_2 \cdot 3H_2O$, 1.4797 g. To this solution is added 24 g of tetramethylammonium hydroxide. The precipitate is purified, dried and calcined as in described in Example 2.

EXAMPLE 5

Oxidation of Ammonia to Nitric Oxide

The catalysts obtained above in Examples 1-4 and others are exposed to a feedstock stream of 3.3 Vol.% ammonia, 6.7 Vol.% oxygen and 90 Vol.% helium under temperature-programmed reaction (TPR) conditions. The temperature is raised at a constant rate of 8° C./minute. The products are analyzed continuously using an online mass spectrometer. The results obtained at 640 K. and 940 K. are shown in Table 1 below.

TABLE 1

EVALUATION OF $NH_3$ OXIDATION TO NO OVER PEROVSKITE CATALYSTS BY TPR
(Feedstock: 3.3 Vol. % $NH_3$, 6.7 Vol. % $O_2$, Balance He, GHSV = 6400 hr$^{-1}$)

| Catalyst Composition | Initial Surface Area m²/g | T = 363° C. (640 K.) | | | T = 663° C. (940 K.) | | |
|---|---|---|---|---|---|---|---|
| | | NO | N₂O | N₂ | NO | N₂O | N₂ |
| LaMnO₃ | 26 | — | — | — | 94 | 1 | 5 |
| LaCoO₃ ᵃ | 8 | 84 | 10 | 7 | 96 | 0 | 4 |
| LaNiO₃ ᵇ | 5 | 95 | 2 | 3 | 98 | 0 | 2 |
| La₀.₇₅Sr₀.₂₅MnO₃ | 22 | 92 | 4 | 4 | 99 | 0 | 1 |
| La₀.₅Sr₀.₅MnO₃ | 39 | 73 | 23 | 5 | 92 | 0 | 8 |
| La₀.₇₅Sr₀.₂₅CoO₃ | 3.1 | 89 | 7 | 3 | 97 | 0 | 3 |
| La₀.₅Sr₀.₅CoO₃ | 5.2 | 76 | 16 | 8 | 95 | 0 | 5 |

Feedstock of $NH_3$ converted = 100% at both temperatures, except:
ᵃ92% conversion at 640K
ᵇ23% conversion at 640K As can be seen from Table 1, for all the materials examined the preferred product is NO. The selectivity for NO is only slightly affected by the addition of strontium ($Sr^{+2}$) to the $LaMnO_3$ or $LaCoO_3$ compounds.

EXAMPLE 6

Stability Tests of Perovskite Catalyst

Catalyst, $LaNiO_3$ is contacted with a gaseous feedstock of 2.5 Vol.% ammonia, 5 Vol.% oxygen and 92.5 Vol.% helium at 923K and 1123K for 220 and 255 hr, respectively.

The results are shown below in Table 2.

TABLE 2

LONG TERM TESTS OF LANTHAM NICKELATE CATALYST ($LaNiO_3$) FOR $NH_3$ OXIDATION
(Feedstock: 2.5 Vol. % $NH_3$, 5 Vol. % $O_2$, Balance He)
(Gas Hourly Space Veolcity = 6400 hr$^{-1}$)

| Temperature (K.) | Duration hours | Selectivity (%) | | | Conversion (Vol. %) |
|---|---|---|---|---|---|
| | | NO | N₂O | N₂ | |
| 923 | 220 | 90 | 2 | 8 | 100 |
| 1123 | 255 | 89 | 1 | 10 | 100 |

As can be seen from Table 2, high catalytic activity is maintained by the $LaNiO_3$ (lanthanum nickelate) catalyst for more than 200 hours of operation. Approximately 90% selectivity to the desired product NO is also retained.

TABLE 3

SUMMARY OF EXPERIMENTAL RESULTS AT 940K GHSV = 6400 hr$^{-1}$)

| Perovskite Catalyst | Crystal Structure | Initial Surface Area m²/g | NO Selectivity (Vol. %) (NO) (NO + N₂ + N₂O) |
|---|---|---|---|
| LaMnO₃ | Orthorhombic | 26.0 | 94 |
| LaCoO₃ | Rhombohedral | 8.1 | 96 |
| LaNiO₃ | Rhombohedral | 5.1 | 98 |

As can be seen from Table 3 which summarizes Table 1, at 940K the selectivity to the desired product, NO, is in excess of 94% for lanthanum manganate, lanthanum cobaltate and lanthanum nickelate.

While some embodiments of the present invention have been shown described herein, it will be apparent to those skilled in the art that various modifications and changes can be made in the disclosed perovskite catalysts used in the selective oxidation of ammonia to nitric oxide without departing from the spirit and scope of the present invention. All such modifications and changes coming withing the scope of the appended claims are intended to be covered thereby.

We claim:

1. A process for the selective oxidation of ammonia to nitric oxide in about 90% or greater yield with a minimum of nitrogen or dinitrogen oxide ($N_2O$) as by-products, which process comprises:
   (1) contacting gaseous ammonia in an oxygen containing gas optionally with an inert gaseous diluent with a mixed metal perovskite catalyst of the general formula: $ABO_3$, wherein:
   A is selected from the alkali, alkaline earth, lanthanide, or actinide metals or a mixture of these metals having a relatively large ionic radius, and
   B is selected from an element or a combination of elements selected from Groups IB, IVB, VB, VIB, VIIB or VIII of the Periodic Table, wherein the perovskite phase of the catalyst has an equilibrium partial pressure of oxygen at 1000° C. of greater than about $10^{-15}$ bar; and
   (2) heating the reactants of step (1) at greater than about 500° C. under conditions of 10 to 100,000 hr$^{-1}$ gas hourly space velocity.

2. The process of claim 1 wherein A is selected from a lanthanum, strontium or mixtures thereof, and B is selected from cobalt, nickel, manganese or mixtures thereof.

3. The process of claim 2 wherein A is selected from lanthanum, strontium or mixtures thereof, and B is selected from cobalt, nickel, manganese or mixtures thereof, with the proviso that when A is lanthanum, B is not cobalt.

4. The process of claim 2 wherein in step (2) the heating is between about 500° and 1200° C.

5. The process of claim 3 wherein in step (2) the heating is between about 500° and 770° C.

6. The process of claim 3 wherein A is a mixture of lanthanum and strontium.

7. The process of claim 6 wherein the ratio of lanthanum to strontium is between about 10/90 and 90/10.

8. The process of claim 7 wherein the ratio of lanthanum to strontium is between about 75/25 and 25/75.

9. The process of claim 1 wherein in step (2), the temperature is between about 570° and 770° C.

10. The process of claim 8 wherein the gas hourly space velocity is between about 1,000 and 10,000 hr$^{-1}$.

11. The process of claim 1 wherein the temperature in step (2) is between about 570° and 770° C.

* * * * *